United States Patent [19]

Ohkawa

[11] 4,302,284
[45] Nov. 24, 1981

[54] HELICAL FIELD STABILIZATION OF PLASMA DEVICES

[75] Inventor: Tihiro Ohkawa, La Jolla, Calif.

[73] Assignee: General Atomic Company, San Diego, Calif.

[21] Appl. No.: 7,503

[22] Filed: Jan. 29, 1979

[51] Int. Cl.³ .............................................. G21B 1/00
[52] U.S. Cl. .................................... 376/133; 376/142
[58] Field of Search ................................ 176/1, 3, 5, 9

[56] References Cited

U.S. PATENT DOCUMENTS

| 2,991,238 | 7/1961 | Phillips et al. | 176/3 |
|---|---|---|---|
| 2,993,851 | 7/1961 | Thomson et al. | 176/3 |
| 3,015,618 | 1/1962 | Stix | 176/3 |
| 3,219,534 | 11/1965 | Furth | 176/3 |
| 3,258,401 | 6/1966 | Kerst | 176/3 |
| 3,278,384 | 10/1966 | Lenard et al. | 176/3 |
| 3,508,104 | 4/1970 | Braams | 176/3 |
| 3,607,627 | 9/1971 | Furth et al. | 176/3 |
| 3,778,343 | 12/1973 | Coppi et al. | 176/3 |
| 3,779,864 | 12/1973 | Kaw et al. | 176/3 |
| 3,801,438 | 4/1974 | Ohkawa | 176/3 |

OTHER PUBLICATIONS

Physics Today, May 1979, pp. 36–42, Francis Chen, Alternate Concepts in Magnetic Fusion.

*Primary Examiner*—S. A. Cangialosi
*Attorney, Agent, or Firm*—Fitch, Even, Tabin, Flannery & Welsh

[57] ABSTRACT

A toroidal plasma device has a toroidal confinement vessel defining a toroidal space and confining ionized gas therein. A solenoid which links the toroidal space induces a toroidal electric field therein to produce plasma current. A plurality of first windings are wound substantially helically around the vessel substantially equally spaced around its minor circumference. A plurality of second windings are wound substantially helically around the vessel substantially midway between successive first windings. Direct current is passed through the respective first and second windings in opposite directions with the current in the respective first and second windings equal or slightly unbalanced. The currents in the first and second windings produce a helical magnetic field. The combination of the poloidal magnetic field from the plasma current with this helical magnetic field produces a separatrix in the toroidal space, this separatrix defining a closed surface which limits and encloses a region within which closed and nested magnetic flux surfaces exist. The sense of rotation of the first and second windings and the direction of the plasma current produces a variation in the safety fractor q with minor radius at any poloidal angle, whereby the sign of q reverses near the outer edge of the plasma, q being an average over a flux surface of the number of transit made around the torus in the toroidal direction by a magnetic flux line in making a single transit in the poloidal direction. The sign of q is determined by the sense of the direction in which the toroidal transit is made.

70 Claims, 8 Drawing Figures

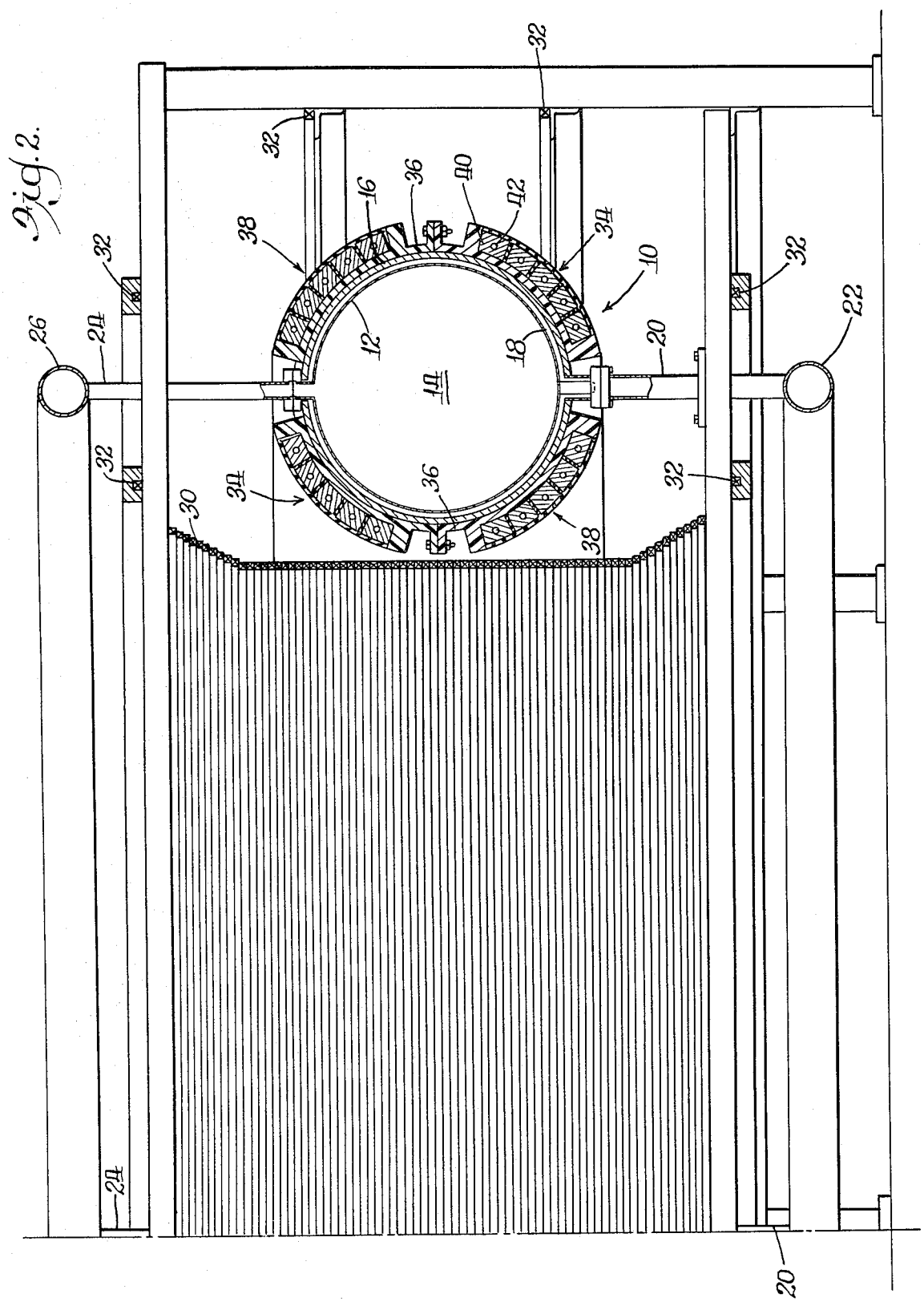

FLUX SURFACES

HELICAL FIELD STABILIZATION OF PLASMA DEVICES

This invention relates generally to plasma devices and particularly to the stabilization of toroidal fusion devices. More particularly, the present invention relates to the combination of helical magnetic field and a poloidal magnetic field for the stabilization of such devices.

Toroidal plasma devices are devices in which plasma is created in a toroidal space and is confined therein by appropriate confining fields. Such devices are useful in the study and analysis of plasmas and particularly in the generation, confinement, study and analysis of hydrogenous plasmas. Such devices are useful in respect to plasma devices for the reaction of deuterium and tritium, with the production of high energy neutrons as reaction products. The present invention finds particular utility in such devices and their applications, including experimental devices and the use thereof in experimentation and investigation in respect to toroidal plasma devices.

The problems in fusion devices are largely in heating the plasma to a high enough temperature to enable the desired reactions to occur and to confine the heated plasma for a time long enough to release energy in excess of that required to produce the reactions. The present invention is directed to the confinement of such plasma.

A number of toroidal plasma devices have been suggested and built. These include the tokamak, the stellarator, and the reversed field pinch. In such devices, gas is confined in a toroidal confinement vessel and is heated to form a plasma which is generally held away from the walls of the confinement vessel by appropriate fields.

In tokamak devices, a toroidal plasma current is produced as by a transformer with the toroidal confined gas acting as the secondary and with the primary being a central solenoid. Upon creation or extinction of the magnetic field produced by current in the solenoid, a toroidal electric field is produced to ionize the gas and drive plasma current around the torus. The pinch effect of the flowing current causes the charged plasma particles to be urged toward the center of the plasma current. However, the plasma current by itself is unstable and some of the plasma would strike the confinement vessel, hence cooling the plasma and hampering any reaction. For this reason, the tokamak also includes a toroidal field coil disposed around the confinement vessel to produce a very large toroidal magnetic field. The interaction of the toroidal magnetic field with the poloidal magnetic field produced by the plasma current produces a relatively stable plasma confinement.

In stellarators the confinement is by magnetic fields produced by external coils and does not rely upon plasma current. In stellarators a toroidal field coil, like that of the tokamak, provides a relatively large toroidal magnetic field in which the plasma is created. In addition to the toroidal magnetic field, a helical field is produced by coils helically disposed about the toroidal confinement vessel. The combination of the toroidal magnetic field with the helical field produces a net twisted magnetic field providing relative stability to the plasma device. Helical coils and toroidal field coils can be combined as in the torsatron device. The difficulty with the stellarators has been the problem of producing the plasma in devices of reasonable size and in providing the very large magnetic field required.

In the reversed field pinch confinement is achieved by trapping a toroidal field in a pinching plasma and inducing a toroidal field of the opposite sign between the plasma and the wall.

The device of the present invention has certain aspects in common with the prior devices, such as the tokamak and the stellarator, but is generically different, particularly in the absence of heavy toroidal field coils. In accordance with the present invention, stability is achieved by the combination of the poloidal magnetic field produced by plasma current and the helical magnetic field produced by helical windings. The helical field superposed on the poloidal field produces a translational transform whereby the flux lines become helical and form twisted flux surfaces.

In order to be magnetohydrodynamically (MHD) stable, toroidal plasma devices must satisfy necessary conditions for the safety factor q, where q is defined as an average length traversed in the toroidal direction per unit poloidal angle of rotation of a magnetic field line on a flux surface, divided by the major radius of the torus, i.e.:

$$q \equiv \frac{<dz/d\theta>}{R} \quad (1)$$

where z is the distance traversed in the toroidal direction, $\theta$ is the poloidal angle of displacement, and R is the major radius. A flux surface is defined as a surface on which the magnetic flux density has no component normal thereto. If r is the minor radius, then these conditions are:

(a) $q \neq 1$ (b) $|dq/dr| \neq 0$, and (c) $\left| \frac{r}{q} \frac{dq}{dr} \right|$ must be large enough to satisfy the Mercier criterion. Tokamak devices and those stellarator devices which carry substantial plasma current generally satisfy condition (a) by operating with $|q| > 1$ throughout the plasma. In contrast, the reversed field pinch device operates with $|q| < 1$ throughout the plasma. A sufficiently large $$\left| \frac{r}{q} \frac{dq}{dr} \right|,$$

an implied shear, is obtained in the reversed field pinch by having a reverse sign near the edge of the plasma. In the case of the reversed field pinch, the flux surfaces are axisymmetric and circular in cross section and q has a simple definition in terms of the toroidal magnetic field $B_T$, the poloidal magnetic field $B_P$, the major radius of the torus R, and the minor radius r; in particular $$q = \frac{B_T}{B_P} \frac{r}{R} \quad (2)$$

for the case of the circular reversed field pinch, as well as for the circular tokamak. Since $B_P$ is unidirectional, the reversal of q can only be obtained by a corresponding reversal in $B_T$ in this case. The reversed field pinch achieves this transiently over the time scale for magnetic flux diffusion by trapping a toroidal field in a pinching plasma and inducing a toroidal field of the opposite sign between the plasma and the wall. The reversed field pinch had the disadvantages that (1) the plasma must be created prior to the creation of the desired field configuration for confinement, and involves either fast field programming or a turbulent initial phase in which the plasma can contact the wall introducing impurities, and (2) the plasma must be resistive for the externally applied magnetic field to penetrate the plasma and produce the desired configuration. However, the lifetime of the plasma is determined by magnetic field diffusion which occurs on the same time scale as the penetration. Therefore, it is difficult to produce the configuration and maintain it over a substantial length of time. The reversed field pinch has the advantages of (1) relatively higher beta ($\beta$), the ratio of the plasma pressure to magnetic pressure, than tokamaks and (2) efficient ohmic heating since the relatively low q operation allows a relatively larger plasma current and aspect ratio R/r of the torus.

The present invention is a generically different device from previous ones. It generates the desired magnetic confinement configuration by currents in helical windings and plasma current, and operates with $|q|<1$ and with a reversed q near the plasma edge, as does the reversed field pinch. However, in the present invention with non-circular flux surfaces, the safety factor q defined as an average on a flux surface can be finite even in the absence of a net toroidal field (averaged over a circle). A reversed q configuration can be set up with no net toroidal field outside the plasma. The invention also allows for the introduction of a small external net toroidal field generated by slightly unbalancing the positive and negative helical coil currents for purposes of shifting the q=0 point to the radial position which is optimal for stability of the plasma.

In the present invention, the value of q near the center of the plasma is substantially due to poloidal and toroidal plasma currents. The poloidal plasma currents generate a net toroidal field within the plasma. This net field decreases toward the edge of the plasma and vanishes outside the plasma. Near the edge of the plasma, q tends to reverse sign because of the toroidal field from the helical coils averaged over a flux surface, this field being in opposition to the net toroidal field generated by the poloidal plasma current.

The present invention achieves a q profile suitable for plasma stability at high beta and suitable for efficient ohmic heating in a configuration which is not limited by magnetic flux diffusion but which persists as long as the currents in the helical coils and in the plasma are maintained. The plasma current is induced by a central solenoid as in the usual tokamak case. The present invention does not depend on toroidicity to achieve stability of the plasma and can be operated as a high-aspect ratio torus, like a bicycle tire, to relax design constraints on the central induction coil for driving the plasma current and on blanket design in a reactor application. The present invention does not require toroidal field coils other than the helical coils. These helical coils are preferably operated to produce a zero or slight net toroidal field. The absence of a large net toroidal field relaxes interwinding forces and stresses. The present invention has a separatrix which bounds the plasma. This separatrix defines a closed surface within which closed and nested magnetic flux surfaces exist. The radial position of the separatrix increases with the plasma current, and the separatrix acts as a magnetic limiter to confine the plasma current channel away from the wall during the start-up of the discharge. A suitable magnetic configuration is achieved at the beginning of the discharge without the necessity of fast field programming or a turbulent transition to the desired state. The separatrix also facilitates the introduction of a divertor, which might be desirable to reduce impurities in the plasma.

More particularly, in accordance with the present invention, a toroidal confinement vessel defines a toroidal space and confines gas therein. A central solenoid generates magnetic flux linking the toroidal space to produce a toroidal electric field which drives plasma current therein. A plurality of first windings are wound substantially helically around the vessel substantially equally spaced around its minor circumference. A plurality of second windings are wound substantially helically around the vessel substantially midway between successive first windings. Direct current is passed through the respective first and second windings in opposite directions with the current in the respective first and second windings equal or slightly unbalanced. The magnitude of the plasma current relative to the magnitude of the currents in the first and second windings produces a separatrix in the toroidal space, this separatrix defining a closed surface which limits and encloses a region within which closed and nested magnetic flux surfaces exist. The sense of rotation of the first and second windings and the direction of the plasma current produces a variation in the safety factor q with minor radius at any poloidal angle, whereby the sign of q reverses near the outer edge of the plasma, q being an average over a flux surface of the number of transits made around the torus in the toroidal direction by a magnetic flux line in making a single transit in the poloidal direction. The sign of q is determined by the sense of the direction in which the toroidal transit is made.

Thus, it is a primary object of the present invention to provide for confinement of plasma in a toroidal plasma device by the combination of a poloidal magnetic field produced by plasma current and a helical magnetic field produced by helical windings. Other objects and advantages of the present invention will become evident from the consideration of the following detailed description, particularly when taken in connection with the accompanying drawings in which:

FIG. 2 is a sectional view of one half of the device shown in FIG. 1, taken along the major axis of the torus, with certain parts of the support structure and vacuum system shown in elevation;

Figure 1:
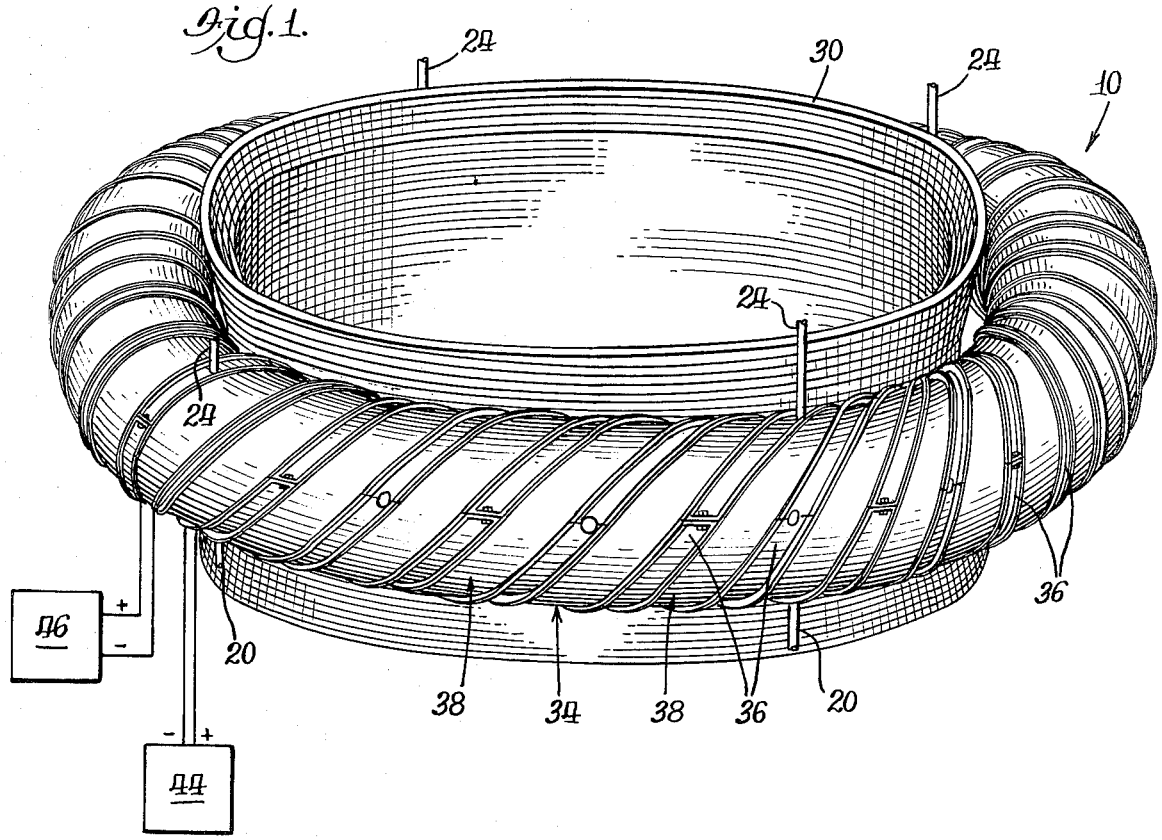
FIG. 1 is an isometric view of one form of toroidal fusion device utilizing a plasma confinement system according to the present invention, with certain parts shown diagrammatically and with the support structure, auxiliary turns and vacuum headers broken away.

As illustrated in FIGS. 1 and 2, a toroidal plasma device 10 includes a primary confinement vessel in the form of a toroidal liner 12 which confines and defines a primary toroidal chamber 14 containing appropriate gas at a suitable low pressure. In the design illustrated, the liner 12 is made of thin wall stainless steel which permits rapid penetration of toroidal electric field to start up and drive plasma current in the primary toroidal chamber 14. The toroidal liner 12 is disposed within and supported from a secondary confinement vessel in the form of a toroidal shell 16. The shell 16 as shown is formed of a relatively thick copper wall forming a secondary toroidal chamber 18. The secondary chamber 18 is evacuated through conduits 20 and a header 22 by a vacuum pump means not shown. The primary chamber 14 is evacuated through conduits 24 and a header 26 by vacuum pump means also not shown.

Figure 4:
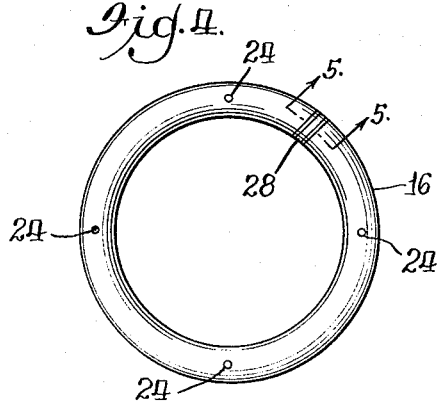
FIG. 4 is a plan view on a reduced scale of the conducting toroidal shell of the device shown in FIG. 2.
Figure 5:
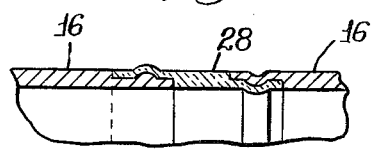
FIG. 5 is an enlarged sectional view of a part of the conducting shell shown in FIG. 4, taken along line 5—5 in FIG. 4.

As shown in FIGS. 4 and 5, the shell 16 includes a ceramic break 28 which serves to interrupt the toroidal conductive path around the shell 16 which would otherwise short circuit the toroidal conductive path through the plasma. The conductance of the liner 12 is sufficiently low in respect to the conductance of the plasma as not to be wasteful of energy. That is, a magnetic field may readily penetrate the conductive shell 16 because of the ceramic break 28 and penetrate the liner 12 because it is relatively thin and of lower conductivity than the material forming the shell 16. At the same time, the liner 12 provides an electrical bridge across the ceramic break 28 and isolates the ionized plasma from the electrical break thereby formed in the conductive shell 16. At the same time, the conducting shell 16 aids in stabilization of the plasma by repelling plasma current trying to move toward the wall of the shell 16.

As with tokamak devices, the plasma current is produced by a toroidal electric field induced by a solenoid coil 30 disposed axially of the major axis of the toroidal liner 12 and inside the torus. The toroidal electric field is created by operation of the solenoid coil 30 and additional turns 32 disposed to channel the poloidal flux outside the liner 12. The solenoid coil 30 and additional turns 32 are energized in a conventional manner by a power supply not shown, whereby the change in electrical current in the coil causes a change in magnetic flux linking the single turn secondary formed by the liner 12 and its contents. The change in flux, in turn, generates plasma current within the primary chamber 14.

A plurality of first windings 34 are wound substantially helically upon a coil form 36 which surrounds the shell 16. As shown best in cross section, FIG. 2, the first windings are substantially equally spaced about the minor circumference of the coil form 36, which may be in the form of two halves bolted together as illustrated. A plurality of second windings 38 are wound substantially helically upon the coils form substantially midway between respective successive first windings. Each of the windings 34 and 38 may be formed of a plurality of turns of conductors 40 which may be square in cross section and insulated from one another. The conductors 40 may include central passages 42 for the circulation of coolant for cooling the conductors.

The first and second windings 34 and 38 are regarded as helical even though they do not form true helices in the sense of being wound upon circular cylinders. The windings 34 and 38 are wound uniformly as they progress around the torus so that the first windings upon making a complete circuit of the torus register with first windings so as to form continuous first windings all the way around the major axis of the torus. That is, where there are two first windings, the number of turns must be integral or half way between. In the latter case, what was one first winding the first time around is the other first winding the second time around. The same thing is true for the second windings 38.

The first windings 34 are energized by a direct current source 44, and the second windings 38 are energized by a direct current source 46. The direct current sources 44 and 46 are oppositely poled so as to pass current through the respective first and second windings in opposite directions. Such currents provide a steady state helical magnetic field within the primary chamber 14 for combining with the poloidal magnetic flux produced by the plasma current for the purpose of containing the plasma current away from the conductive walls of the liner 12. The helical windings 34 and 38 are preferably wound at such pitch as to produce relatively small interwinding forces and good plasma stability. An angle of about 45° to the minor axis of the torus is suitable.

Figure 3:
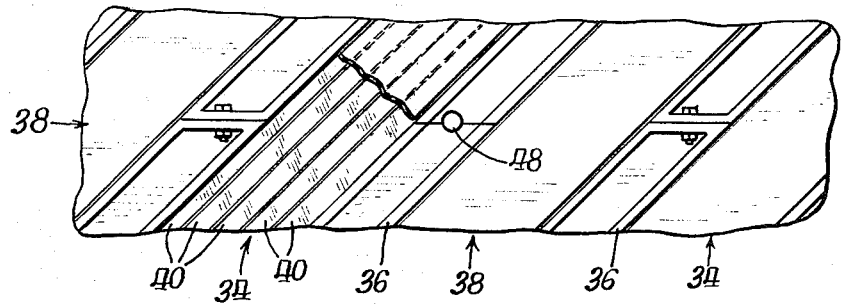
FIG. 3 is a fragmentary view in elevation of the device shown in FIG. 2, with part of the insulation broken away to show the helical windings.

As shown in FIGS. 1, 2, and 3, there may be two first windings and two second windings disposed about the minor circumference of the torus. Three of each such windings can also be used, filling the primary chamber more fully with plasma but possibly with less stability. A greater number is possible under some conditions. The power supplies are connected so that the current through the first windings can be equal to or slightly greater than the current through the second windings, whereby a zero or a net toroidal magnetic field is produced by the helical windings 34 and 38. In general, the total current in the second windings 38 is comparable in magnitude to one half the plasma current.

The additional turns 32 can be operated to apply a vertical magnetic field to the plasma as to balance the effect of hoop force which tends to expand the plasma in major radius, or to adjust the equilibrium plasma for best stability.

The device may include observation ports 48.

Figure 6:
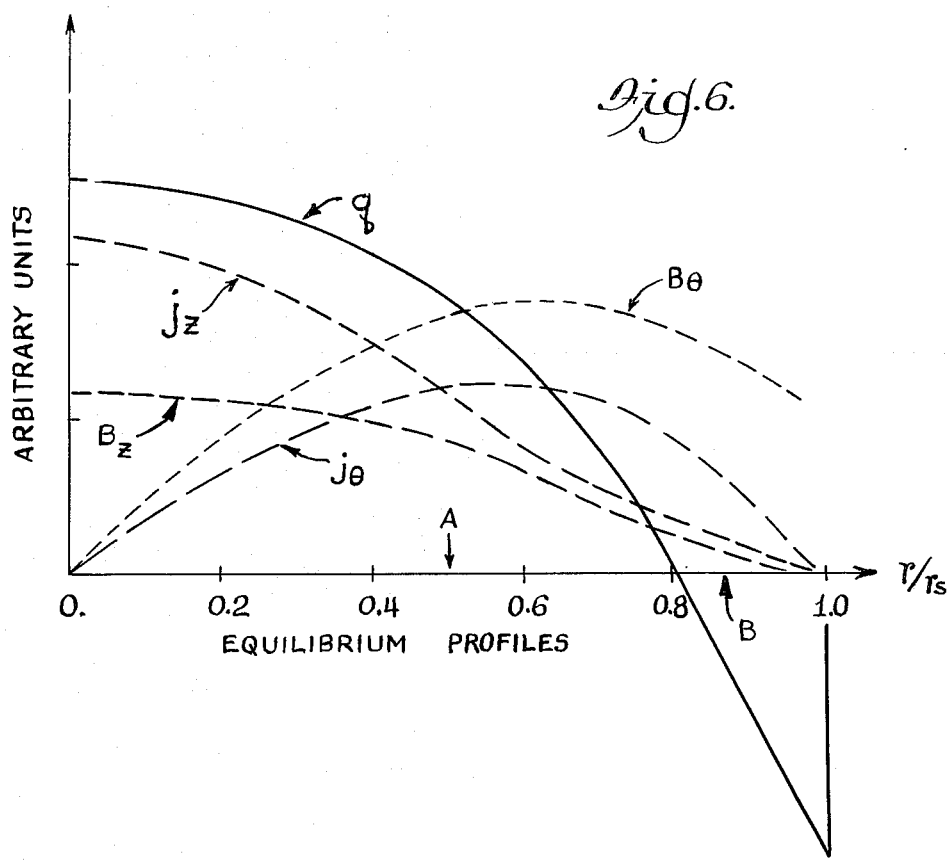
FIG. 6 is a graphical illustration of equilibrium profiles of current, flux density and safety factor under certain operating conditions of the device illustrated in FIG. 1.

In typical operation of a device as shown in FIGS. 1 through 5, the plasma current generated by operation of the solenoid coil 30 and additional turns 32 is about 40 kA maximum, which requires a magnetic flux swing of about 0.3 V-sec. with a rise time of about 10 msec. To achieve a ratio $\beta$ of plasma pressure to magnetic field pressure of about 0.1 while maintaining good stability, typically the temperature T of the plasma will be about 100 eV, with a density n of $10^{13}$ particles per cc., a magnetic flux density B of 1 kilogauss, an energy containment time $\tau_E$ of 0.3 msec. and a pulse duration $\tau_{pulse}$ of 30 msec. The total current in the first windings is about 20 kA and in the second windings is also about 20 kA. The ratio of the mean radius of the plasma current $r_p$ to the mean radius of the windings $r_w$ is about 0.75. Under such conditions, the equilibrium profiles of certain parameters have been calculated to be qualitatively as shown in FIG. 6.

Figure 7:
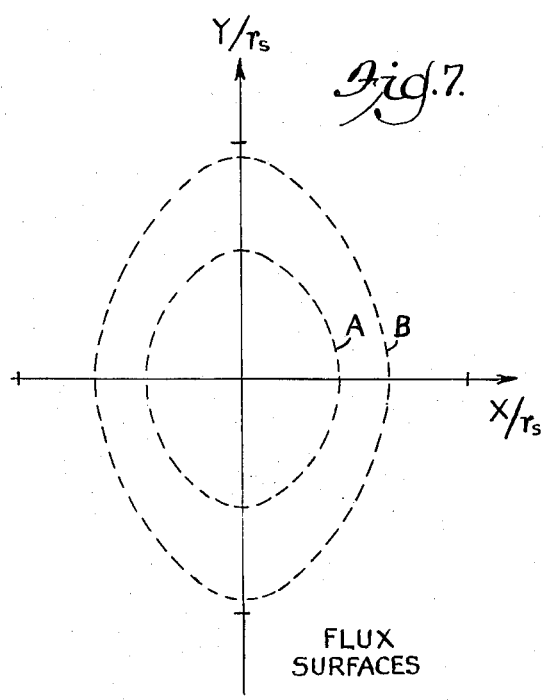
FIG. 7 is a graphical illustration of magnetic flux surfaces at two particular radii of the device illustrated in FIG. 1, under the same conditions.

The relationships among the various parameters of the system and their relationships to the operation of the system are complicated and depend upon many different factors. For the sake of explanation, the curves of FIG. 6 have been prepared based upon certain parameters which have been selected somewhat arbitrarily. For the curves illustrated, the aspect ratio of the primary chamber 14, that is, the ratio of major to minor radii of the torus, is high. More particularly, the parameters there illustrated are: $j_z$, the current density in the direction of the minor axis of the torus; $j_\theta$, the current density in the direction around the minor axis; $B_z$, the net magnetic flux density in the direction of the minor axis; $B_\theta$, the magnetic flux density around the minor axis, and q, the safety factor related to $B_z$ and the pitch of the magnetic field lines as defined previously. The parameter $r/r_s$ is the ratio of the minor radius coordinate to the minor radius of the separatrix, this ratio evaluated along an angle of 45° to the $X/r_s$ axis of FIG. 7. FIG. 7 illustrates the magnetic flux surfaces generated under these conditions at points A and B of FIG. 6. A condition for stability is that q pass through zero.

The manner of operation of this invention with the resultant stable plasma can be described mathematically. The mathematics, however, becomes very complex for certain configurations. If certain practical approximations are made, the explanation can be much simplified. For example, as a practical matter it is desirable to operate with a high aspect ratio; that is, the ratio of the major radius to the minor radius of the torus can be very large, somewhat like a bicycle tire. In such cases the toroidal effects can be neglected in favor of a cylindrical approximation. The main field is $B_{\theta,o}(r)$ produced by the plasma current. A helical winding produces a magnetic field given by a static potential $\Phi$, $$\Phi = (b/k)I_l(kr)\cos(l\theta + kz) \tag{3}$$

where $I_l$ is the modified Bessel function of order 1.

The components of the magnetic field are given by $$\begin{cases} B_r = -b\,I_l'(kr)\cos(l\theta + kz) & (4) \\ B_\theta = -\dfrac{bl}{kr} I_l(kr)\sin(l\theta + kz) & (5) \\ B_z = b\,I_l \sin(l\theta + kz) & (6) \end{cases}$$

Here $I_l'(kr)$ is the derivative of $I_l(kr)$ with respect to its argument. The entire field may be expressed in terms of the flux function $\psi^*$ given by $$\psi^* = \psi_o^* - (br/l)I_l'(kr)\sin(l\theta + kz) \tag{7}$$

where $\psi_o^* = -\int B_{\theta,o}\,dr$.

Surfaces defined by $\psi^* = \text{const.}$ are the flux surfaces. The shapes of the flux surfaces may be calculated approximately by setting $$r = a + \xi\left(\theta + \frac{k}{l} z\right) \tag{8}$$

By expansion, $$\psi^*(a) + \frac{\partial \psi^*}{\partial r} \xi \approx \text{const.} \tag{9}$$

or $$\xi \approx (\psi^*(a) - \psi_o^*(a))/\frac{\partial \psi^*}{\partial r} \tag{10}$$

$$\sim (\psi^*(a) - \psi_o^*(a))/\frac{\partial \psi_o^*}{\partial r}$$

It follows $$\xi \sim -\{(ba/l)I_l'(ka)/(B_{\theta,o})\}\sin(l\theta + kz). \tag{11}$$

The translational transform may be calculated by the flux line equations $$\frac{dz}{d\theta} = \frac{rB_z}{B_\theta} \tag{12}$$

By using expansion (8)

$$\frac{dz}{d\theta} \approx \frac{br I_l \sin(l\theta + kz)}{B_{\theta,o} + \dfrac{\partial B_{\theta,o}}{\partial r}\xi + (bl/kr)I_l(kr)\sin(l\theta + kz)} \tag{13}$$

The average value is then given by $$\left\langle \frac{dz}{d\theta} \right\rangle \sim \frac{-b^2 r I_l}{2B_{\theta,o}^2}\left(\frac{\partial B_{\theta,o}}{B_{\theta,o}\partial r}(r/l)I_l' + (l/kr)I_l\right) \tag{14}$$

The safety factor q is as defined above $$q = \frac{1}{R}\left\langle \frac{dz}{d\theta}\right\rangle \tag{1}$$

The volume $\Delta V$ between two flux surfaces $\psi^*$ and $\psi^* + \Delta\psi^*$ may be calculated from $$\Delta V = \int_{\psi^*}^{\psi^* + \Delta\psi^*} r\,dr\,d\theta\,dz \tag{15}$$

By using $r = a + \xi$, $$\Delta V = 2\pi aR\int d\theta\left(1 + \frac{\partial \xi}{\partial a}\right)(1 + \xi/a)da \tag{16}$$

$$\approx (2\pi)^2 aR\Delta a = (2\pi)^2 aR\left(\frac{\partial \psi_o^*}{\partial r}\right)^{-1}\Delta\psi^*$$

The longitudinal flux $\bar\psi$ is calculated from $$\bar\psi = \int B_z\,r\,dr\,d\theta \tag{17}$$

By using Eqs. (6), (8), and (10), $$\Delta\bar\psi \approx \frac{b^2 I_l I_l'}{2lB_{\theta,o}}\left(\frac{akI_l'}{I_l} + 1 + a\frac{\partial}{\partial a}\ln\left[\frac{aI_l'}{B_{\theta,o}}\right]\right)\left(\frac{\partial \psi_o^*}{\partial r}\right)^{-1} a\Delta\psi^* \tag{18}$$

The combination of Eqs. (16) and (18) yields $$\frac{\Delta V}{\Delta\bar\psi} \approx (2\pi)^2 R\frac{2lB_{\theta,o}}{b^2 I_l I_l'}\left(\frac{akI_l'}{I_l} + 1 + a\frac{\partial}{\partial a}\ln\left[\frac{aI_l'}{B_{\theta,o}}\right]\right)^{-1} \tag{19}$$

It is a decreasing function of a and indicates $d^2V/d\bar{\psi}^2 < 0$. This characteristic has been called a magnetic well; C. Mercier, "Lectures in Plasma Physics", Fontenay-aux-Roses (1974). In the limit of $\beta \to 0$, this assures stability. More intuitively, the magnetic well means that the average longitudinal magnetic field increases as one moves away from the plasma, where "average" means flux-surface average. The maximum well depth occurs for r=0.

Using Mercier's notation, the magnetohydrodynamic equilibria in the cylindrical approximation may be calculated using the equation given by $$LF + \frac{2hlr^2}{(l^2+h^2r^2)^2} f + \frac{r^2}{2(l^2+h^2r^2)} \frac{df^2}{dF} + r^2 \frac{dp}{dF} = 0 \quad (20)$$

The helical variable $u = l\theta - hz$ in the cylindrical coordinates $(r,\theta,z)$ and the vector $\vec{u} = (l\vec{e}_z + hr\vec{e}_\theta)(l^2+h^2r^2)^{-1}$ define the helix. The magnetic field B is written as $$\vec{B} = \vec{f u} + \vec{u} \times \text{grad } F \quad (21)$$

The operation L is defined by $$L = r\frac{\partial}{\partial r} \frac{r}{l^2+h^2r^2} \frac{\partial}{\partial r} + \frac{\partial^2}{\partial u^2} \quad (22)$$

It is convenient to use the variable G defined by $$F = r\frac{\partial G}{\partial r} \quad (23)$$

Then $$LF = r\frac{\partial}{\partial r} \frac{r^2}{l^2+h^2r^2}(\nabla^2 G) \quad (24)$$

It is instructive to calculate a simple example equilibrium, where f=const. and p'=const. Then Eq. (20) becomes $$r\frac{\partial}{\partial r}\left(\frac{r^2}{l^2+h^2r^2} \nabla^2 G\right) + \frac{2hlr^2}{(l^2+h^2r^2)^2} f + r^2 p' = 0 \quad (25)$$

By integrating $$\nabla^2 G - \frac{lf}{hr^2} + \frac{l^2+h^2r^2}{2} p' = \frac{l^2+h^2r^2}{r^2} C \quad (26)$$

where C is a constant.

Putting $G = G_o(r) + g(r,u)$ (27)

$$\frac{1}{r}\frac{d}{dr}(rG_o') = \frac{lf}{hr^2} - \frac{l^2+h^2r^2}{2}p' + \frac{l^2+h^2r^2}{r^2} C \quad (28)$$

$$\nabla^2 g = 0 \quad (29)$$

This is a special case where the vacuum field g is separated out. In order to avoid the singularity on the axis in the absence of the internal conductor, $$C = -\frac{f}{hl} \quad (30)$$

By integration of Eq. (28), $$rG_o' = \frac{-r^2}{8}(2l^2 + h^2r^2)p' - \frac{hr^2}{2l} f \quad (31)$$

The external vacuum field g is given by $$g = (b/h)I_l(hr) \sin(l\theta - hz) \quad (32)$$

The function F is then given by $$F = rG_o' + rg' \quad (33)$$

$$= \frac{-r^2}{8}(2l^2 + h^2r^2)p' - \frac{hr^2}{2l} f + brI_l'(hr) \times \sin(l\theta - hz)$$

The magnetic fields are $$B_\theta = \frac{-rl}{2} p' + \frac{bl}{hr} I_l \sin(u) \quad (34)$$

$$B_z = f/l + \frac{hr^2}{2} p' - bI_l \sin(u) \quad (35)$$

If there is no solenoidal field applied, then the axial field vanishes at the plasma edge $r = r_o$. Then $$f/l = -(hr_o^2/2)p' \quad (36)$$

This indicates that the plasma produces a paramagnetic axial field of f/l on the axis. On the other hand, if f=0, an external field of $-(hr_o^2/2) p'$ is required. The plasma is diamagnetic to this field.

The current density j is given by $$\vec{j} = -\left[\frac{1}{2}\frac{df^2}{dF} + (l^2+h^2r^2)\frac{dp}{dF}\right]\vec{u} - \vec{u} \times \text{grad } f \quad (37)$$

The azimuthal component is $$j_\theta = \quad (38)$$

$$-\left[\frac{1}{2}\frac{df^2}{dF} + (l^2+h^2r^2)\frac{dp}{dF}\right]\frac{hr}{l^2+h^2r^2} - \frac{l}{l^2+h^2} \frac{\partial f}{\partial r}$$

Obviously f=const. does not lead to small $j_\theta$. The equilibria with small $j_\theta$ are the ones of interest.

Consider a case where f=(2h/l)F and p'=const. The equilibrium equation is given by $$LF + \frac{4h^2r^2}{(l^2+h^2r^2)^2} F + \frac{4h^2r^2}{l^2(l^2+h^2r^2)} F + r^2 p' = 0 \quad (39)$$

Putting $$F = -(l^2/4)p'r^2 + H \quad (40)$$

Eq. (39) becomes $$LH + \frac{4h^2r^2}{(l^2+h^2r^2)^2} H + \frac{4h^2r^2}{l^2(l^2+h^2r^2)} H = 0 \quad (41)$$

In this case, the pressure is supported by azimuthally symmetric $j_z B_\theta$ force and the helical field H is a force-free field. The field and the current are given by $$B_r = -\frac{1}{r} \frac{\partial H}{\partial u} \qquad (42)$$

$$B_\theta = -(lr/2)p' + \frac{1}{l^2 + h^2 r^2}\left[(2h^2 r/l)H + \frac{\partial H}{\partial r}\right] \qquad (43)$$

$$B_z = \frac{1}{l^2 + h^2 r^2}\left[2hH - hr\frac{\partial H}{\partial r}\right] \qquad (44)$$

$$j_r = -\frac{2h}{rl}\frac{\partial H}{\partial u} \qquad (45)$$

$$j_\theta = \frac{-1}{l^2 + h^2 r^2}\left[(4h^2/l^2)H + 2h\frac{\partial H}{\partial r}\right] \qquad (46)$$

$$j_z = -lp' + \frac{1}{l^2 + h^2 r^2}\left[-(4h^2/l)H + (2h^2 r/l)\frac{\partial H}{\partial r}\right] \qquad (47)$$

Note that only $j_z$ and $B_\theta$ have non-helical components.

Equations 42–47 describe an equilibrium which has no non-helical contribution to $B_z$ on axis. On the other hand, the equilibrium described by equations 34–38 has a very large non-helical $B_z$ component. In between these two equilibria lie equilibria that have an intermediate $B_z$ component to give an appropriate q profile. Thus, by superposing the two example equilibria described, an equilibrium of a desired amount of the solenoidal axial field may be obtained. FIGS. 6 and 7 illustrate qualitatively the type of equilibrium which is desired. Such an equilibrium is expected to be stable according to Mercier's criterion for beta values in excess of 10%.

Mercier's criterion, which must be satisfied for the plasma to be stable, is given by $$\left[-\frac{1}{2}\frac{1}{q^2}\frac{dq}{d\psi} + \int\frac{\vec{B}\cdot\vec{E}}{|\text{grad }\psi|^3}dS\right]^2 + \int\frac{B^2 dS}{|\text{grad }\psi|^3}\left[\frac{dp}{d\psi}q^{-2}\frac{d^2V}{d\psi^{-2}} - \int\frac{|\vec{E}|^2 dS}{|\text{grad }\psi|^3}\right] \geqq 0 \qquad (48)$$

The quantity $\Xi$ as used by Mercier is proportional to the pressure gradient and the last term corresponds to the destabilizing effect of the pressure.

The criterion reduces to the Suydam's criterion for a cylindrical pinch given by $$\frac{1}{4r^2}\left(\frac{d\ln q}{d\ln r}\right)^2 + \frac{2}{r}\frac{1}{B_z^2}\frac{dp}{dr} \geqq 0 \qquad (49)$$

It has been known that pinches can be made stable by profiling $B_z$ and q. The outer part of the plasma is stabilized by a large shear and a small $\beta$ with respect to the axial field. The inner part is made stable by having a hollow pressure distribution. In these configurations, the axial field is reversed, i.e., there is a null of the axial field in the plasma. The profile must be maintained for the stability throughout the duration of the discharge. This is one of the experimental difficulties of the reversed field pinch.

If $B_z$ is taken to represent the axial transform in the criterion, the outer part of the plasma is stabilized because of the shear and a large transform. The inner part has to be stabilized by an axial field produced by the plasma current and/or by unbalancing the current in the helical windings to counter the axial transform, thus having a q profile similar to the reversed field pinch. At any rate, the q profile in this case is externally controlled. The amount of the axial field is controlled by unbalancing the current in the positive and the negative helical windings. A proper q profile can be maintained independent of the plasma skin time.

Relating this physically to the structure illustrated in FIGS. 1–5 and to the curves of FIGS. 6 and 7, the twisted magnetic field produced by plasma current and the helical magnetic field produced by windings 34 and 38 result in magnetic flux surfaces wherein the safety factor q as a function of radial displacement from the minor axis of the toroid has a substantial slope and changes monotonically, reversing sign near the outer edge of the plasma. By adding or subtracting a small amount of toroidal magnetic flux relatively uniformly across the torus, the net toroidal flux as a function of radial displacement can be moved up or down to cross zero at an optimum radius for confining the plasma. Such additional toroidal magnetic flux is generated by the unbalance of the helical magnetic fields produced by the respective first and second windings 34 and 38.

As defined above, a flux surface is a surface on which the magnetic flux density, evaluated at any point on the surface, has no component normal to the surface. In other words, a flux surface is a surface which no magnetic field lines penetrate. The field lines lie on the flux surfaces. The flux surfaces are nested. A criterion for stability is that the flux surfaces be nested and separated from the confinement wall. In a toroidal configuration, the flux surfaces must be closed.

Thus, in accordance with the present invention, the combination of the poloidal magnetic field produced by the plasma current and the helical magnetic field produced by the helical windings provide a magnetic limiter separating the plasma current from the confinement wall of the plasma vessel. This creates the separatrix, which defines a closed surface which limits and encloses the region within which the closed and nested flux surfaces exist.

As defined above in equation 1, $$q \equiv \frac{<dz/d\theta>}{R} \qquad (1)$$

where q is the safety factor, R is the major radius of the torus, and $dz/d\theta$ is the average length traversed in the toroidal direction per unit poloidal angle of rotation of a magnetic field line on a magnetic flux surface. In accordance with this definition, an average magnetic field line in a flux surface makes q transits around the torus in the toroidal direction in making a single transit in the poloidal direction. (In the present case, q is a fraction which is less than 1.) Thus, the safety factor q on a particular flux surface is the ratio of the average pitch of magnetic field lines in that flux surface to the major circumference of the torus, where pitch is the displacement in the toroidal direction for a single transit, or cycle, in the poloidal direction. As stated by equation 12, $dz/d\theta$ is also given by $$\frac{dz}{d\theta} = \frac{rB_z}{B_\theta} \qquad (12)$$

where r is the minor radius, $B_z$ is the longitudinal or toroidal magnetic field and $B_\theta$ is the poloidal magnetic field.

$$< \frac{dz}{d\theta} >$$

is the translational transform.
Thus, $$q = \frac{<rB_z/B_\theta>}{R} \qquad (50)$$

where the angular brackets indicate an average over a flux surface. For circular concentric flux surfaces in an axisymmetric system, the average is a simple average over the poloidal angle $\theta$; that is, $$q = \frac{\frac{1}{2\pi}\int_0^{2\pi}(rB_z/B_\theta)d\theta}{R} \qquad (51)$$

but since neither $B_z$ nor $B_\theta$ depends strongly on $\theta$, $$q \simeq \frac{rB_z/B_\theta}{R} = \frac{B_z}{B_\theta}\frac{r}{R} \qquad (52)$$

for such case. Equation 52 is appropriate for a tokamak or a reversed field pinch. For tokamaks, q is greater than 1 everywhere, and for the reversed field pinch, q vanishes only when $B_z$ vanishes. In such case, $B_z$ is a net toroidal field, meaning that it persists when averaged over poloidal angle $\theta$.

Figure 8:
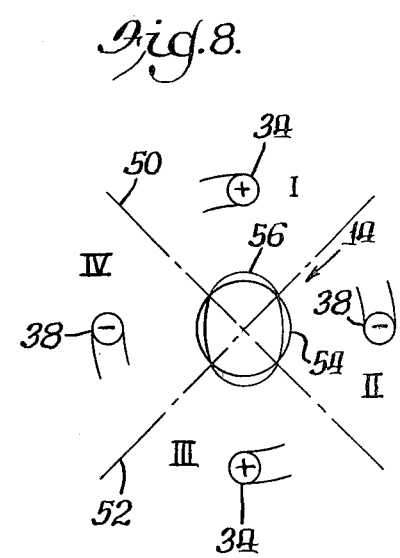
FIG. 8 is a simplified view of the device as shown in FIG. 2.

In the case of the present invention, in the embodiment where the currents in the helical windings are balanced, there is no net $B_z$ except that due to poloidal plasma currents. However, there can be an average $B_z$ on a flux surface. This may be understood by reference to FIG. 8, which is a simplified version of FIG. 2. The windings 34 and 38 are represented by single conductors and the rest of the apparatus is omitted for the sake of clarity in this explanation. Dashed lines 50 and 52 have been drawn to separate the space in the chamber 14 into quadrants. On these lines, the toroidal magnetic field is zero. In quadrants I and III, the toroidal field is caused by the first windings 34 and is directed up out of the plane of FIG. 8 for the twist as shown. In quadrants II and IV the toroidal field is opposite to this. The toroidal field averaged over a circular loop 54 is zero, because it passes equally through all four quadrants. If the circle is distorted into an ellipse 56, the toroidal field averaged over the loop is now non-zero. For the loop 56, the path is longer in quadrants I and III and shorter in quadrants II and IV. Also, the path is nearer to the first windings 34 in quadrants I and III, where the toroidal field is stronger, and farther from the second windings 38 in quadrants II and IV, in a reduced toroidal field. Both the extra path length and larger field weight the average to have quadrants I and III dominate. This makes an average toroidal field on the loop 56 which is directed up out of the plane of FIG. 8. Near the center of the plasma the net toroidal field is generated by poloidal plasma current. At a point near the edge of the plasma the effect of the remaining poloidal plasma current, that which remains between that point and the edge, is relatively much smaller and can be overcome by the flux-surface-average toroidal field due to the helical coils. This gives the q reversal with balanced coils when the appropriate currents and fields are applied with proper polarity.

The device of the present invention as thus described differs fundamentally in both principle and structure from the prior art devices as exemplified by tokamaks, stellarators and reversed field pinch devices, although the present device has certain features in common with each. More particularly, like the tokamak, the present device requires plasma current to generate the appropriate magnetic flux configuration, and the configuration does not decay on the flux diffusion time scale. On the other hand, the tokamak requires toroidal field coils and not helical field coils; whereas the present device requires helical field coils but not toroidal field coils. The tokamak requires q greater than 1; whereas the present device does not. The present device requires q to cross zero as a function of radial displacement; whereas the tokamak does not.

Like the stellarator, the present device requires helical field coils; but unlike the stellarator, it does not require toroidal field coils. As in the stellarator, the magnetic configuration does not decay on the flux diffusion time scale, but unlike the present device, the stellarator does not require plasma current to generate the magnetic configuration. The stellarator requires a large toroidal flux $B_z$; whereas the present device does not require any net applied toroidal flux, although a small applied $B_z$ may be desirable for optimization. The present device requires that q cross zero as a function of radial displacement, which the stellarator does not. In contrast, a stellarator with a substantial plasma current generally requires q>1 for stability.

Like reversed field pinch devices, the present device requires plasma current to generate the magnetic configuration and for q to cross zero. Neither requires q greater than 1. On the other hand, the present device requires helical coils, which the reversed field pinch devices do not, and has a separatrix, which the reversed field pinch does not. The magnetic configuration decays on the flux diffusion time scale in reversed field devices but not in the present device.

These differences and others provide substantial advantages for the present device. The fact that no large toroidal magnetic field is required permits great economy in manufacture and ease of operation as makes this a more practical device. The large toroidal magnetic fields required for tokamaks and stellarators apparently require superconducting magnetic coils and imply large interwinding forces that produce stresses difficult to contain.

Prior devices have often involved neutral beam heating which has proven inefficient, bulky, and expensive, and has caused problems when the beam hit a wall. The present device in general is relatively smaller, being capable of high beta, high aspect ratio, and no applied net toroidal field, and permits adequate ohmic heating in conjunction with the induced plasma current.

A problem, particularly with tokamaks, has been the relatively small space available for the plasma heating coils. The present device in its preferred form has a relatively large aspect ratio, permitting more space for such coils and other appurtenances such as a reactor blanket. This eases the design requirements of the heating coils. This also permits scaling to larger devices merely by increasing the major radius while keeping the minor radius the same.

The present design provides a higher $\beta$, the ratio of plasma pressure to magnetic pressure, permitting more efficient operation at lower magnetic fields.

The present design provides an inherent magnetic limiter whereby the separatrix moves radially outward as the plasma current increases, maintaining a stable configuration. This is because outside the confining flux surface there it no confinement and any plasma outside the separatrix is immediately lost to the confining wall without wastefully carrying any substantial current.

The present design also facilitates the incorporation of a divertor, which is difficult to introduce in tokamaks.

An advantage over the reversed field pinch devices is that such devices operate with a q profile that changes for the worse as the magnetic flux diffuses out of the system. The time is so short as to have severely limited the development of a practical reactor based on the reversed field concept.

While the novel aspects of a fusion device in accordance with the present invention have been shown in a preferred embodiment, various modifications may be made therein within the scope of the invention, as in the size and shape and in driving currents. For example, the direct current in the windings 34 and 38 may take the form of relatively long unidirectional pulses. The device may also include various well-known appurtenances of fusion devices such as power supplies, vacuum pumps, instrumentation, blankets, supporting structures, and heat exchangers.

Although the preferred embodiment of the invention is a toroidal system, the invention may also be utilized in a straight cylindrical system appropriately bounded. As the length L of a toroidal system is the major circumference $2\pi R$, the safety factor q may be defined in terms of L:

$$q \equiv \frac{2\pi}{L} < \frac{dz}{d\theta} > \tag{51}$$

This safety factor as thus defined is applicable to a straight cylindrical system of length L.

I claim:

1. A toroidal plasma device comprising
a toroidal confinement vessel having walls for defining a toroidal space and confining gas therein,
means for generating magnetic flux linking said toroidal space to induce substantial toroidal plasma current therein, said toroidal plasma current producing a substantial poloidal magnetic field,
first and second windings wound substantially helically around said vessel with the same sense of twist at substantially the same pitch, said first windings and said second windings being disposed alternately and substantially equally spaced around the minor circumference of said vessel, and
means for passing first direct current through said first windings and second direct current through said second windings in the direction counter to said first direct current to generate a helical magnetic field acting in combination with said poloidal magnetic field to produce closed and nested magnetic flux surfaces spaced from said vessel walls, wherein a safety factor q within said plasma current is the sum of two components, one being axisymmetric and substantially proportional to the ratio of toroidal magnetic field to poloidal magnetic field, and the other being nonaxisymmetric and substantially helically symmetric and substantially the quantity $$\frac{-b^2 r I_l(kr)}{2 B_{\theta,o}^2 R} \left( \frac{\partial B_{\theta,o}}{B_{\theta,o} \partial r} (r/l) I_l'(kr) + (l/kr) I_l(kr) \right)$$

where b is a measure of the strength of the magnetic field from said helical windings, R is the major radius of said toroidal space, r is the average minor radius of the magnetic flux surface, $B_{\theta,o}$ is the poloidal magnetic field produced by said toroidal plasma current, $$\frac{\partial B_{\theta,o}}{\partial r}$$

is the partial derivative of $B_{\theta,o}$ with respect to r, l is the number of said first windings, k is the wavenumber of the magnetic field produced by said first and second windings, $I_l(kr)$ is the modified Bessel function of order l, and $I_l'(kr)$ is the derivative of $I_l(kr)$ with respect to its argument, q being defined as the average over a flux surface of the number of transits made around said toroidal space in the toroidal direction by a magnetic flux line in making a single transit in the poloidal direction, and the absolute magnitude of q being less than 1 within said plasma current.

2. A toroidal plasma device according to claim 1 wherein the sense of twist of said first and second windings and the direction of said plasma current produce a variation in the safety factor q with minor radius at any poloidal angle whereby the polarity of q reverses near the outer edge of said plasma current.

3. A toroidal plasma device comprising
a toroidal confinement vessel for defining a toroidal space and confining gas therein,
means for generating magnetic flux linking said toroidal space to induce substantial toroidal plasma current therein, said toroidal plasma current producing a substantial poloidal magnetic field,
first and second windings wound substantially helically around said vessel with the same sense of twist at substantially the same pitch, said first windings and said second windings being disposed alternately and substantially equally spaced around the minor circumference of said vessel, and
means for passing first direct current through said first windings and passing second direct current through said second windings in the direction counter to said first direct current to generate a helical magnetic field acting in combination with said poloidal magnetic field to produce a variation in a safety factor q with minor radius at any poloidal angle whereby the polarity of q reverses near the outer edge of the plasma current, q being defined as the average over a flux surface of the number of transits made around said toroidal space in the toroidal direction by a magnetic flux line in making a single transit in the poloidal direction, wherein a safety factor q within said plasma current is the sum of two components, one being axisymmetric and substantially proportional to the ratio of toroidal magnetic field to poloidal magnetic field, and the other being nonaxisymmetric and substantially helically symmetric and substantially the quantity $$\frac{-b^2 r I_l(kr)}{2 B_{\theta,o}^2 R} \left( \frac{\partial B_{\theta,o}}{B_{\theta,o} \partial r} (r/l) I_l'(kr) + (l/kr) I_l(kr) \right)$$

where b is a measure of the strength of the magnetic field from said helical windings, R is the major radius of said toroidal space, r is the average minor radius of the magnetic flux surface, $B_{\theta,o}$ is the poloidal magnetic field produced by said toroidal plasma current, $$\frac{\partial B_{\theta,o}}{\partial r}$$

is the partial derivative of $B_{\theta,o}$ with respect to r, l is the number of said first windings, k is the wavenumber of the magnetic field produced by said first and second windings, $I_l(kr)$ is the modified Bessel function of order l, and $I_l'(kr)$ is the derivative of $I_l(kr)$ with respect to its argument, and q being less than 1 within said plasma current.

4. A toroidal plasma device comprising
a toroidal confinement vessel having walls for defining a toroidal space and confining gas therein,
means for generating magnetic flux linking said toroidal space to induce substantial toroidal plasma current therein, said toroidal plasma current producing a substantial poloidal magnetic field,
means for generating a vertical magnetic field within said toroidal space, said vertical field being perpendicular to the equatorial plane of said toroidal space,
first and second windings wound substantially helically around said vessel with the same sense of twist at substantially the same pitch, said first windings and said second windings being disposed alternately and substantially equally spaced around the minor circumference of said vessel, and
means for passing first direct current through said first windings and second direct current through said second windings in the direction counter to said first direct current to generate a helical magnetic field acting in combination with said poloidal magnetic field and said vertical field to produce closed and nested magnetic flux surfaces spaced from said vessel walls, wherein a safety factor q within said plasma current is the sum of two components, one being axisymmetric and substantially proportional to the ratio of toroidal magnetic field to poloidal magnetic field, and the other being nonaxisymmetric and substantially helically symmetric and substantially the quantity $$\frac{-b^2 r I_l(kr)}{2 B_{\theta,o}^2 R} \left( \frac{\partial B_{\theta,o}}{B_{\theta,o} \partial r} (r/l) I_l'(kr) + (l/kr) I_l(kr) \right)$$

where b is a measure of the strength of the magnetic field from said helical windings, R is the major radius of said toroidal space, r is the average minor radius of the magnetic flux surface, $B_{\theta,o}$ is the poloidal magnetic field produced by said toroidal plasma current, $$\frac{\partial B_{\theta,o}}{\partial r}$$

is the partial derivative of $B_{\theta,o}$ with respect to r, l is the number of said first windings, k is the wavenumber of the magnetic field produced by said first and second windings, $I_l(kr)$ is the modified Bessel function of order l, and $I_l'(kr)$ is the derivative of $I_l(kr)$ with respect to its argument, q being defined as the average over a flux surface of the number of transits made around said toroidal space in the toroidal direction by a magnetic flux line in making a single transit in the poloidal direction, and the absolute magnitude of q being less than 1 within said plasma current.

5. A toroidal plasma device according to claim 4 wherein said means for generating a vertical field comprises a plurality of circular coils coaxial with the major axis of said toroidal space.

6. A toroidal plasma device according to claim 4 wherein the sense of twist of said first and second windings and the direction of said plasma current produce a variation in the safety factor q with minor radius at any poloidal angle whereby the polarity of q reverses near the outer edge of said plasma current.

7. A toroidal plasma device according to claim 6 wherein said means for generating a vertical field comprises a plurality of circular coils coaxial with the major axis of said toroidal space.

8. A toroidal plasma device according to claim 3 including means for generating a vertical field within said toroidal space, said vertical field being perpendicular the equatorial plane of said toroidal space.

9. A toroidal plasma device according to any one of claims 1, 2, 3, 4, 5, 6, 7 and 8 further comprising
means for producing net applied toroidal magnetic field in said toroidal space.

10. A toroidal plasma device according to claim 9 wherein said helical magnetic field and said poloidal magnetic field generate a separatrix within said toroidal space bounding the region in which said nested magnetic flux surfaces exist.

11. A toroidal plasma device according to claim 10 wherein the distance of said separatrix from the minor axis of said toroidal space increases with an increase in said plasma current.

12. A toroidal plasma device according to claim 9 including means for separating said plasma current from said vessel walls.

13. A toroidal plasma device according to any one of claims 1, 2 and 3 wherein said first and second direct currents are substantially equal.

14. A toroidal plasma device according to claim 9 wherein said means for producing net applied toroidal magnetic field comprises means for unbalancing said first and second direct currents.

15. A toroidal plasma device according to claim 9 wherein said means for generating magnetic flux comprises a solenoid coaxial with the major axis of said toroidal space.

16. A toroidal plasma device according to claim 15 wherein said toroidal confinement vessel comprises a conductive thin toroidal wall.

17. A toroidal plasma device according to claim 16 including means for evacuating said toroidal space.

18. A toroidal plasma device according to claim 17 wherein the number of said first and second windings around the minor circumference are each two.

19. A toroidal plasma device according to claim 17 wherein the number of said first and second windings around the minor circumference are each three.

20. A toroidal plasma device according to claim 17 including a toroidal shell containing and spaced from said confinement vessel, said shell being of electrically conductive material with the conductive path interrupted in the toroidal direction.

21. A toroidal plasma device according to claim 9 wherein said first and second windings are wound at such pitch as to produce relatively small interwinding forces when said first and second direct currents are passed therethrough.

22. A toroidal plasma device according to claim 21 wherein said windings are wound at an angle of approximately 45° to the minor axis of the confinement vessel.

23. A plasma device comprising
a confinement vessel having an axis and an axial direction and walls surrounding the axis thereof for defining a space and confining gas therein,
means for producing substantial plasma current within said space in said axial direction, said plasma current producing a substantial magnetic field around said axis within the plasma,
first and second windings wound substantially helically around said vessel with the same sense of twist at substantially the same pitch, said first windings and said second windings being disposed alternately and substantially equally spaced around said axis, and
means for passing first direct current through said first windings and second direct current through said second windings in the direction counter to said first direct current to generate a helical magnetic field acting in combination with the magnetic field produced by said plasma current to produce nested magnetic flux surfaces within said plasma, which surfaces are spaced from said vessel walls and are closed in the direction transverse of the axis, wherein a safety factor q within said plasma current is the sum of two components, one being axisymmetric and substantially proportional to the ratio of axial magnetic field to circumaxial magnetic field, and the other being nonaxisymmetric and substantially helically symmetric and substantially the quantity $$\frac{-b^2 r I_l(kr)\pi}{B_{\theta,o}^2 L}\left(-\frac{\partial B_{\theta,o}}{B_{\theta,o}\partial r}(r/l)I_l'(kr) + (l/kr)I_l(kr)\right)$$

where b is a measure of the strength of the magnetic field from said helical windings, L is the length of said plasma current within said space, r is the average radius of the magnetic flux surface, $B_{\theta,o}$ is the circumaxial magnetic field produced by said axial plasma current, $$\frac{\partial B_{\theta,o}}{\partial r}$$

is the partial derivative of $B_{\theta,o}$ with respect to r, l is the number of said first windings, k is the wavenumber of the magnetic field produced by said first and second windings, $I_l(kr)$ is the modified Bessel function of order l, and $I_l'(kr)$ is the derivative of $I_l(kr)$ with respect to its argument, q being defined as the average over a flux surface of the number of transits of the length of the plasma current by a magnetic flux line in making a single transit around the plasma current, and the absolute magnitude of q being less than 1 said plasma current.

24. A plasma device according to claim 23 wherein the sense of twist of said first and second windings and the direction of said plasma current produce a variation in the safety factor q with distance from the center of said plasma current in any direction transverse to said plasma current whereby the polarity of q reverses near the boundary of said plasma current.

25. A plasma device according to either one of claims 23 and 24 wherein said helical magnetic field and said magnetic field produced by said plasma current generate a separatrix within said space bounding the region in which said nested magnetic flux surfaces exist.

26. A plasma device according to claim 25 wherein the distance of said separatrix from the center of said plasma current increases with an increase in said plasma current.

27. A plasma device according to either one of claims 23 and 24 including means for separating said plasma current from said vessel walls.

28. A plasma device comprising
a confinement vessel for defining a space having an axis and an axial direction and confining gas therein,
means for producing substantial plasma current within said space in said axial direction, said plasma current producing a substantial magnetic field around said axis,
first and second windings wound substantially helically around said vessel with the same sense of twist at substantially the same pitch, said first windings and said second windings being disposed alternately and substantially equally spaced around said vessel, and
means for passing first direct current through said first windings and second direct current through said second windings in the direction counter to said first direct current to generate a helical magnetic field acting in combination with said magnetic field produced by said plasma current to produce a variation in a safety factor q with distance from the center of said plasma current in any direction transverse to said plasma current whereby the polarity of q reverses near the boundary of said plasma current, q being defined as the average over a flux surface of the number of transits of the length of the plasma current by a magnetic flux line in making a single transit around the plasma current, wherein the safety factor q within said plasma current is the sum of two components, one being axisymmetric and substantially proportional to the ratio of axial magnetic field to circumaxial magnetic field, and the other being nonaxisymmetric and substantially helically symmetric and substantially the quantity $$\frac{-b^2 r I_l(kr)\pi}{B_{\theta,o}^2 L}\left(-\frac{\partial B_{\theta,o}}{B_{\theta,o}\partial r}(r/l)I_l'(kr) + (l/kr)I_l(kr)\right)$$

where b is a measure of the strength of the magnetic field from said helical windings, L is the length of said plasma current within said space, r is the average minor radius of the magnetic flux surface, $B_{\theta,o}$ is the circumaxial magnetic field produced by said axial plasma current, $$\frac{\partial B_{\theta,o}}{\partial r}$$

is the partial derivative of $B_{\theta,o}$ with respect to r, l is the number of said first windings, k is the wavenumber of the magnetic field produced by said first and second windings, $I_l(kr)$ is the modified Bessel function of order l, and $I_l'(kr)$ is the derivative of $I_l(kr)$ with respect to its argument, and the absolute magnitude of q being less than 1 within said plasma current.

29. A plasma device according to any one of claims 23, 24 and 28 wherein said first and second direct currents are substantially equal.

30. A plasma device according to any one of claims 23, 24 and 28 further comprising
  means for producing net applied magnetic field in said direction in said space.

31. A plasma device according to claim 30 wherein said means for producing net applied magnetic field comprises means for unbalancing said first and second direct currents.

32. A plasma device according to claim 30 wherein said first and second windings are wound at such pitch as to produce relatively small interwinding forces when said first and second direct currents are passed therethrough.

33. A plasma device according to claim 32 wherein said windings are wound at an angle of approximately 45° to the axial direction.

34. A method of operating a toroidal plasma device having a toroidal confinement vessel with walls defining a toroidal space and confining gas therein, said method comprising
  inducing substantial toroidal plasma current in said toroidal space, said toroidal plasma current producing a substantial poloidal magnetic field, and
  generating a helical magnetic field by passing first and second direct currents through respective first and second windings wound substantially helically around said vessel with the same sense of twist at substantially the same pitch, said first windings and said second windings being disposed alternately and substantially equally spaced around the minor circumference of said vessel, said second direct current being passed in the direction counter to said first direct current,
  said helical magnetic field combining with said poloidal magnetic field to produce closed and nested magnetic flux surfaces spaced from said vessel walls, wherein a safety factor q within said plasma current is the sum of two components, one being axisymmetric and substantially proportional to the ratio of toroidal magnetic field to poloidal magnetic field, and the other being nonaxisymmetric and substantially helically symmetric and substantially the quantity $$\frac{-b^2 r I_l(kr)}{2 B_{\theta,o}^2 R} \left( \frac{\partial B_{\theta,o}}{B_{\theta,o} \partial r} (r/l) I_l'(kr) + (l/kr) I_l(kr) \right)$$

where b is a measure of the strength of the magnetic field from the helical windings, R is the major radius of said toroidal space, r is the average minor radius of the magnetic flux surface, $B_{\theta,o}$ is the poloidal magnetic field produced by said toroidal plasma current, $$\frac{\partial B_{\theta,o}}{\partial r}$$

is the partial derivative of $B_{\theta,o}$ with respect to r, l is the number of said first windings, k is the wavenumber of the magnetic field produced by said first and second windings, $I_l(kr)$ is the modified Bessel function of order l, and $I_l'(kr)$ is the derivative of $I_l(kr)$ with respect to its argument, q being defined as the average over a flux surface of the number of transits made around said toroidal space in the toroidal direction by a magnetic flux line in making a single transit in the poloidal direction, and the absolute magnitude of q being less than 1 within said plasma current.

35. A method according to claim 34 wherein the sense of twist of said first and second windings and the direction of said plasma current produce a variation in the safety factor q with minor radius at any poloidal angle whereby the polarity of q reverses near the outer edge of said plasma current.

36. A method of operating a toroidal plasma device having a toroidal confinement vessel with walls defining a toroidal space and confining gas therein, said method comprising
  inducing substantial toroidal plasma current in said toroidal space, said toroidal plasma current producing a substantial poloidal magnetic field, and
  generating a helical magnetic field by passing first and second direct currents through respective first and second windings wound substantially helically around said vessel with the same sense of twist at substantially the same pitch, said first windings and said second windings being disposed alternately and substantially equally spaced around the minor circumference of said vessel, said second direct current being passed in the direction counter to said first direct current,
  said helical magnetic field combining with said poloidal magnetic field to produce a variation in a safety factor q with minor radius at any poloidal angle whereby the polarity of q reverses near the outer edge of the plasma current, q being defined as the average over a flux surface of the number of transits made around said toroidal space in the toroidal direction by a magnetic flux line in making a single transit in the poloidal direction, and the absolute magnitude of q being less than 1 within said plasma current.

37. A method of operating a toroidal plasma device having a toroidal confinement vessel with walls defining a toroidal space and confining gas therein, said method comprising inducing substantial plasma current in said toroidal space, said toroidal plasma current producing a substantial poloidal magnetic field, generating a vertical magnetic field within said toroidal space, said vertical field being perpendicular to the equatorial plane of said toroidal space, and generating a helical magnetic field by passing first and second direct currents through respective first and second windings wound substantially helically around said vessel with the same sense of twist at substantially the same pitch, said first windings and said second windings being disposed alternately and substantially equally spaced around the minor circumference of said vessel, said second direct current being passed in the direction counter to said first direct current, said helical magnetic field combining with said poloidal magnetic field and said vertical field to produce closed and nested magnetic flux surfaces spaced from vessel walls, wherein a safety factor q within said plasma current is the sum of two components, one being axisymmetric and substantially proportional to the ratio of toroidal magnetic field to poloidal magnetic field, and the other being nonaxisymmetric and substantially helically symmetric and substantially the quantity $$\frac{-b^2 r I_l(kr)}{2 B_{\theta,o}^2 R} \left( \frac{\partial B_{\theta,o}}{B_{\theta,o} \partial r} (r/l) I_l'(kr) + (l/kr) I_l(kr) \right)$$

where b is a measure of the strength of the magnetic field from the helical windings, R is the major radius of said toroidal space, r is the average minor radius of the magnetic flux surface, $B_{\theta,o}$ is the poloidal magnetic field produced by said toroidal plasma current, $$\frac{\partial B_{\theta,o}}{\partial r}$$

is the partial derivative of $B_{\theta,o}$ with respect to r, l is the number of said first windings, k is the wavenumber of the magnetic field produced by said first and second windings, $I_l(kr)$ is the modified Bessel function of order l, and $I_l'(kr)$ is the derivative of $I_l(kr)$ with respect to its argument, q being defined as the average over a flux surface of the number of transits made around said toroidal space in the toroidal direction by a magnetic flux line in making a single transit in the poloidal direction, and the absolute magnitude of q being less than 1 within said plasma current.

38. A method according to claim 37 wherein said vertical field is generated by currents in circular windings coaxial with the major axis of said toroidal space.

39. A method according to claim 37 wherein the sense of twist of said first and second windings and the direction of said plasma current produce a variation in the safety factor q with minor radius at any poloidal angle whereby the polarity of q reverses near the outer edge of said plasma current.

40. A method according to claim 39 wherein said vertical field is generated by currents in circular windings coaxial with the major axis of said toroidal space.

41. A method according to claim 36 including the step of generating a vertical magnetic field within said toroidal space, said vertical field being perpendicular to the equatorial plane of said toroidal space.

42. A method according to any one of claims 34, 35, 36, 37, 38, 39, 40 and 41 wherein net toroidal magnetic field is applied in said toroidal space.

43. A method according to claim 42 wherein said helical magnetic field and said poloidal magnetic field generate a separatrix within said toroidal space bounding the region in which said nested magnetic flux surfaces exist.

44. A method according to claim 43 wherein the distance of said separatrix from the minor axis of said toroidal space is increased by increasing said plasma current.

45. A method according to claim 42 wherein said plasma current is separated from said vessel walls.

46. A method according to any one of claims 34, 35 and 36 wherein said fist and second direct currents are substantially equal.

47. A method according to claim 42 wherein said net applied toroidal magnetic field is produced at least in part by the unbalance of said first and second direct currents.

48. A method according to claim 42 wherein said plasma current is induced by changing magnetic flux linking said toroidal space.

49. A method of operating a plasma device having a confinement vessel with an axis and an axial direction with walls surrounding the axis thereof for defining a space and confining gas therein, said method comprising producing substantial plasma current in said space in said axial direction, said plasma current producing a substantial magnetic field around said axis, and generating a helical magnetic field by passing first and second direct currents through respective first and second windings wound substantially helically around said vessel with the same sense of twist at substantially the same pitch, said first windings and said second windings being disposed alternately and substantially equally spaced around said axis, said second direct current being passed in the direction counter to said first direct current, said helical magnetic field combining with said magnetic field produced by said plasma current to produce nested magnetic flux surfaces within said space, which surfaces are spaced from said vessel walls and are closed in the direction transverse of the axis, wherein a safety factor q within said plasma current is the sum of two components, one being axisymmetric and substantially proportional to the ratio of axial magnetic field to circumaxial magnetic field, and the other being nonaxisymmetric and substantially helically symmetric and substantially the quantity $$\frac{-b^2 r I_l(kr)\pi}{B_{\theta,o}^2 L} \left( -\frac{\partial B_{\theta,o}}{B_{\theta,o} \partial r} (r/l) I_l'(kr) + (l/kr) I_l(kr) \right)$$

where b is a measure of the strength of the magnetic field from said helical windings, L is the length of said plasma current within said space, r is the average radius of the magnetic flux surface, $B_{\theta,o}$ is the circumaxial magnetic field produced by said axial plasma current, $$\frac{\partial B_{\theta,o}}{\partial r}$$

is the partial derivative of $B_{\theta,o}$ with respect to r, l is the number of said first windings, k is the wave number of the magnetic field produced by said first and second windings, $I_l(kr)$ is the modified Bessel function of order l, and $I'_l(kr)$ is the derivative of $I_l(kr)$ with respect to its argument, q being defined as the average over a flux surface of the member of transits of the length of the plasma current by a magnetic flux line in making a single transit around the plasma current, and the absolute magnitude of q being less than 1 within said plasma current.

50. A method according to claim 49 wherein the sense of twist of said first and second windings and the direction of said plasma current produce a variation in the safety factor q with distance from the center of said plasma current in any direction transverse to said plasma current whereby the polarity of q reverses near the boundary of said plasma current.

51. A method according to either one of claims 49 and 50 wherein said helical magnetic field and said magnetic field produced by said plasma current generate a separatrix within said space bounding the region in which said nested magnetic flux surfaces exist.

52. A method according to claim 51 wherein the distance of said separatrix from the center of said plasma current is increased by increasing said plasma current.

53. A method according to either one of claims 49 and 50 wherein said plasma current is separated from said vessel walls.

54. A method of operating a plasma device having a confinement vessel for defining a space having an axis and an axial direction and confining gas therein, said method comprising producing substantial plasma current in said space in said axial direction, said plasma current producing a substantial magnetic field around said axis, and generating a helical magnetic field by passing first and second direct currents through respective first and second windings wound substantially helically around said vessel with the same sense of twist at substantially the same pitch, said first windings and said second windings being disposed alternately and substantially equally spaced around said vessel, said second direct current being passed in the direction counter to said first direct current, said helical magnetic field combining with said magnetic field produced by said plasma current to produce a variation in a safety factor q with distance from the center of said plasma current in any direction transverse to said plasma current whereby the polarity of q reverses near the boundary of said plasma current, q being defined as the average over a flux surface of the number of transits of the length of the plasma current by a magnetic flux line in making a single transit around the plasma current, and the absolute magnitude of q being less than 1 within said plasma current.

55. A method according to any one of claims 49, 50 and 54 wherein said first and second direct currents are substantially equal.

56. A method according to any one of claims 49, 50 and 54 wherein net magnetic field is applied in the direction of plasma current.

57. A method according to claim 56 wherein said net applied magnetic field is produced at least in part by the unbalance of said first and second direct currents.

58. A method according to claim 56 wherein said plasma current is induced by changing magnetic flux linking said space.

59. A toroidal plasma device according to any one of claims 1, 2 and 4 to 7 wherein said helical magnetic field and said poloidal magnetic field generate a separatrix within said toroidal space bounding the region in which said nested magnetic flux surfaces exist.

60. A toroidal plasma device according to claim 59 wherein the distance of said separatrix from the minor axis of said toroidal space increases with an increase in said plasma current.

61. A toroidal plasma device according to any one of claims 1, 2 and 4 to 7 including means for separating said plasma current from said vessel walls.

62. A method according to any one of claims 34, 35 and 37 to 40 wherein said helical magnetic field and said poloidal magnetic field generate a separatrix within said toroidal space bounding the region in which said nested magnetic flux surfaces exist.

63. A method according to claim 62 wherein the distance of said separatrix from the minor axis of said toroidal space is increased by increasing said plasma current.

64. A method according to any one of claims 34, 35 and 37 to 40 wherein said plasma current is separated from said vessel walls.

65. A plasma device according to any one of claims 1, 2, 3, 23, 24, 28, 4, 5, 6 and 7 wherein the number of said first and second windings are each more than 1.

66. A toroidal plasma device according to claim 9 wherein the number of said first and second windings are each more than 1.

67. A plasma device according to claim 30 wherein the number of said first and second windings are each more than 1.

68. A method according to any one of claims 34, 35, 36, 49, 50, 54, 37, 38, 39 and 40 wherein the number of said first and second windings are each more than 1.

69. A method according to claim 42 wherein the number of said first and second windings are each more than 1.

70. A method according to claim 56 wherein the number of said first and second windings are each more than 1.

* * * * *

UNITED STATES PATENT AND TRADEMARK OFFICE
CERTIFICATE OF CORRECTION

PATENT NO. : 4,302,284
DATED : November 24, 1981
INVENTOR(S) : Tihiro Ohkawa

It is certified that error appears in the above-identified patent and that said Letters Patent is hereby corrected as shown below:

Abstract Page, Column 1, to the References Cited add --3,433,705 3/1969 Cornish 176/3--.

Abstract, line 23, change "fractor" to --factor--; line 26, change "transit" to --transits--.

Column 1, line 8, after "of" insert --a--; line 53, change "interaction" to --combination-- and "with" to --and--.

Column 2,
line 38, change "(b) |dq/dr| $\neq$ 0" to --(b) dq/dr $\neq$ 0--; line 57, change "a" to --q--.

Column 5, line 64, change "coils" to --coil--.

Column 8, line 1, delete ---continued--; lines 2 to 5, change Equation (10) to read:

$$--\xi \approx -(\psi^*(a) - \psi_0^*(a))/\frac{\partial \psi^*}{\partial r}$$
$$\approx -(\psi^*(a) - \psi_0^*(a))/\frac{\partial \psi_0^*}{\partial r} --;$$

UNITED STATES PATENT AND TRADEMARK OFFICE
CERTIFICATE OF CORRECTION

PATENT NO. : 4,302,284

DATED : November 24, 1981

INVENTOR(S) : Tihiro Ohkawa

It is certified that error appears in the above-identified patent and that said Letters Patent is hereby corrected as shown below:

Column 8,
line 28, change Equation (14) to read:

$$-- \left\langle \frac{dz}{d\theta} \right\rangle \sim \frac{-b^2 r I_\ell(kr)}{2 B_{\theta,o}^2} \left( \frac{-\partial B_{\theta,o}}{B_{\theta,o} \partial r} (r/\ell) I'_\ell(kr) + (\ell/kr) I_\ell(kr) \right) --;$$

Column 9, line 19, change "B" to $--\vec{B}--$; line 23, change Equation (21) to read: $--\vec{B} = f\vec{u} + \vec{u} \times \text{grad } F--$; line 38, in Equation (24), change "V$^2$" to $--\nabla^2--$; line 46, in Equation (25) change "V$^2$G" to $--\nabla^2 G--$; line 51, in Equation (26) change "V$^2$G" to $--\nabla^2 G--$; line 59, change Equation (29) to read: $--\nabla^2 g = 0--$.

Column 11, lines 37-42, in Equation (48) change "$\vec{E}$", both occurrences, to $--\vec{\bar{E}}--$, and change "$d\psi^{-2}$" to $--d\bar{\psi}^2--$.

Column 12, line 38, change "provide" to --provides--.

Column 13, line 20, in Equation (51) change "$\frac{1}{2}\pi$" to $--\frac{1}{2\pi}--$;

UNITED STATES PATENT AND TRADEMARK OFFICE
CERTIFICATE OF CORRECTION

PATENT NO. : 4,302,284

DATED : November 24, 1981

INVENTOR(S) : Tihiro Ohkawa

It is certified that error appears in the above-identified patent and that said Letters Patent is hereby corrected as shown below:

Column 16, line 5, change "$\partial B_{\theta,o}$" to -- $-\partial B_{\theta,o}$ --.

Column 17, lines 5 and 60, change "$\partial B_{\theta,o}$" to -- $-\partial B_{\theta,o}$ --.

Column 22, line 1, change "$\partial B_{\theta,o}$" to -- $-\partial B_{\theta,o}$ --.

Column 23, line 30, change "$\partial B_{\theta,o}$" to -- $-\partial B_{\theta,o}$ --.

Column 24, line 18, change "fist" to --first--.

Column 25, line 9, change "and $I_\ell(kr)$" to --and $I'_\ell(kr)$--; line 11, change "member" to --number--.

Signed and Sealed this

Third Day of July 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,302,284
DATED : November 24, 1981
INVENTOR(S) : Tihiro Ohkawa

It is certified that error appears in the above-identified patent and that said Letters Patent is hereby corrected as shown below:

Column 2, line 36, change "(a) $q \neq 1$" to --(a) $|q| \neq 1$--.

Column 7, line 48, in Equation (6), change "$I_\ell$" to --$I_\ell(kr)$--.

Column 8, line 20, in the numerator of the right side of Equation (13) change "$I_\ell$" to --$I_\ell(kr)$--.

Column 13, line 29, change "q" to --$|q|$--.

Column 14, line 15, change "q" to --$|q|$--.

Column 14, line 33, change "q" to --$|q|$--.

Column 14, line 36, change "q", second occurrence, to --$|q|$--.

Signed and Sealed this

Eleventh Day of June 1985

[SEAL]

Attest:

DONALD J. QUIGG

*Attesting Officer*  *Acting Commissioner of Patents and Trademarks*